United States Patent
Gothoskar et al.

(10) Patent No.: US 7,298,949 B2
(45) Date of Patent: Nov. 20, 2007

(54) SOI-BASED PHOTONIC BANDGAP DEVICES

(75) Inventors: Prakash Gothoskar, Allentown, PA (US); Margaret Ghiron, Allentown, PA (US); Robert Keith Montgomery, Easton, PA (US); Vipulkumar Patel, Breinigsville, PA (US); Soham Pathak, Allentown, PA (US); David Piede, Allentown, PA (US); Kalpendu Shastri, Orefield, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 10 days.

(21) Appl. No.: 11/042,774

(22) Filed: Jan. 24, 2005

(65) Prior Publication Data

US 2005/0179986 A1    Aug. 18, 2005

Related U.S. Application Data

(60) Provisional application No. 60/544,088, filed on Feb. 12, 2004.

(51) Int. Cl.
*G02B 6/10* (2006.01)
*G02B 6/12* (2006.01)

(52) U.S. Cl. .............................. 385/130; 385/2; 385/8; 385/14; 385/15

(58) Field of Classification Search ............. 385/15, 385/16, 131, 132, 130
See application file for complete search history.

(56) References Cited

U.S. PATENT DOCUMENTS

| | | | |
|---|---|---|---|
| 6,542,682 B2 | 4/2003 | Cotteverte et al. | |
| 6,674,778 B1 * | 1/2004 | Lin et al. | 372/46.01 |
| 6,804,283 B2 | 10/2004 | Scherer | |
| 6,813,064 B2 | 11/2004 | John et al. | |
| 6,839,488 B2 | 1/2005 | Gunn, III | |
| 6,845,198 B2 | 1/2005 | Montgomery et al. | |
| 6,931,191 B2 * | 8/2005 | Kitagawa et al. | 385/129 |
| 2004/0150873 A1 * | 8/2004 | Pearsall | 359/321 |
| 2004/0223768 A1 | 11/2004 | Shastri et al. | |

* cited by examiner

*Primary Examiner*—Michelle R. Connelly-Cushwa
(74) *Attorney, Agent, or Firm*—Wendy W. Koba

(57) ABSTRACT

An SOI-based photonic bandgap (PBG) electro-optic device utilizes a patterned PBG structure to define a two-dimensional waveguide within an active waveguiding region of the SOI electro-optic device. The inclusion of the PBG columnar arrays within the SOI structure results in providing extremely tight lateral confinement of the optical mode within the waveguiding structure, thus significantly reducing the optical loss. By virtue of including the PBG structure, the associated electrical contacts may be placed in closer proximity to the active region without affecting the optical performance, thus increasing the switching speed of the electro-optic device. The overall device size, capacitance and resistance are also reduced as a consequence of using PBGs for lateral mode confinement.

16 Claims, 6 Drawing Sheets

Fig. 5 (a) Prior Art

SOI-BASED PHOTONIC BANDGAP DEVICES

CROSS-REFERENCE TO RELATED APPLICATION

This application claims the priority of U.S. Provisional Application No. 60/544,088, filed Feb. 12, 2004.

SUMMARY OF THE INVENTION

The present invention relates to silicon-on-insulator (SOI)-based electro-optic devices and, more particularly, to the inclusion of photonic bandgap (PBG) structures within the SOI devices to provide for improved lateral confinement of a propagating optical signal, thus reducing optical loss and improving the speed of such SOI-based electro-optic devices.

BACKGROUND OF THE INVENTION

Photonic bandgap (PBG) structures, which represent the optical equivalent of the energy gap in semiconductors, promise a wealth of new, very compact, optical devices. PBG structures can confine light in very tight regions, allowing for the radiation to be guided or bent around sharp corners with virtually no energy loss. PBGs are expected to reduce the size of optical devices by orders of magnitude and allow for a larger scale of integration.

Indeed, the concept of a PBG is analogous to the periodicity of the atoms or molecules of an ordinary crystal. The PBG comprises an artificial structure in which elements with different refractive indices are disposed in a periodic arrangement. Thus, for a certain range of wavelengths, there are no states for the photons to occupy in the structure. Photons with these wavelengths are thus defined as "forbidden" and cannot propagate. As opposed to opaque materials (such as metals), PBG structures are usually formed of a dielectric, so that no energy is absorbed by the structure.

The presence of a defect in a PBG structure generally results in a "localized state", that is, a tightly confined region of light energy that must stay within the defect, since it cannot propagate in the structure, and its energy cannot be absorbed by the structure. Therefore, if the defects are appropriately designed and arranged, they can be used to create waveguides with very small dimensions and excellent directional control and light confinement properties. Indeed, many optical devices—such as optical add/drop filters, multiplexers/demultiplexers, resonators, cavities, etc.—have now been realized using PBG structures.

With the emergence of silicon-on-insulator (SOI) technology for the fabrication of optical devices, two-dimensional PBG structures have been developed that may be realized by etching the desired hole pattern in the thin silicon surface layer (generally referred to as the "SOI layer") so as to form the optical band structure. The photons with appropriate energy will pass through regions of high refractive index (e.g., silicon, or a polysilicon layer disposed over the silicon) interspersed with regions of low refractive index (e.g., the "hole" structures, where the holes are generally filled with commonly-used low index dielectric materials such as oxides or nitrides). To a photon, this contrast in refractive index looks just like the periodic potential that an electron experiences traveling through a silicon crystal. The large contrast in refractive index, as mentioned above, allows for the light to be confined in a very small region.

The diameter and periodicity of the etched holes (subsequently filled with low dielectric material), together with the contrast in effective refractive index between the high index and low index regions, are the parameters that can be modified to produce the desired two-dimensional PBG structure. Indeed, to form a photonic bandgap, the etched holes need to be separated by a distance roughly equal to the photon wavelength divided by the refractive index. The width of the bandgap depends on the contrast in effective refractive index between the two materials in the lattice—with a larger contrast yielding a wider bandgap.

As mentioned above, extremely tight confinement within the waveguide region of a PBG structure makes it possible to bend the light around sharp corners with low energy loss, enabling the formation of very small optical circuits. For example, state-of-the-art silicon-based strip or rib single mode waveguides can be achieved with dimensions on the order of 0.34 µm. However, a significant portion of the energy will reside in the "tail" outside of the core and into the cladding. By virtue of using a PBG structure, little if any energy will be outside of the waveguide boundaries.

Active electro-optic devices including PBGs are currently being fabricated by filling the holes in the structure with a polymer or liquid crystal, then using an applied external signal to re-arrange the periodicity of the material to affect the change in wavelength. Micro-electromechanical systems (MEMS) are also being explored to provide the desired active control. However, both of these arrangements exhibit a relatively slow speed of operation (not acceptable for multiple Gb/s applications), and do not readily lend themselves to high volume manufacture. Other arrangements, to date, require the formation of a resonant cavity within the guiding structure and are therefore extremely wavelength-selective.

Thus, a need remains in the art for a tunable PBG structure that exhibits the requisite speed and manufacturability demands for future, high speed opto-electronic applications.

SUMMARY OF THE INVENTION

The need remaining in the prior art is addressed by the present invention, which relates to silicon-on-insulator (SOI)-based electro-optic devices and, more particularly, to the inclusion of photonic bandgap (PBG) structures within the SOI devices to provide for improved lateral confinement of a propagating optical signal, thus reducing optical loss and improving the speed of such SOI-based electro-optic devices.

In accordance with the present invention, incorporation of the PBG structure with SOI-based devices allows for the propagating optical mode to be extremely well-confined in the lateral dimension, thus minimizing optical loss for a signal propagating along the SOI waveguide. The use of the PBG structure also allows for the electrical contacts to be placed relatively close to the waveguiding region (as a result of the improved confinement) and thus improve the operating speed of the electro-optic device.

An advantage of the incorporation of the PBG structure in the SOI-based electro-optic devices in accordance with the present invention is that the overall device size may be reduced (in comparison to prior art SOI-based devices), thus reducing the overall system capacitance and resistance—further improving the speed and responsivity of the electro-optic device.

In one embodiment of the present invention, a polysilicon layer is added to the based SOI structure and is disposed over the SOI layer, with the PBG structure formed through the combination of layers (or only one or the other of the layers). A relatively thin gate dielectric layer is positioned between the SOI layer and the polysilicon layer, where the SOI and polysilicon layers are complementarily doped to create an active region of a Semiconductor-Insulator-Semiconductor CAPacitor (SISCAP) device that is tunable across the gate dielectric through the application of an electrical modeling signal.

It is an advantage of the PBG structures of the present invention that conventional CMOS processing techniques may be used to form the PBG structures and, importantly, integrate these structures within the same silicon substrate as the associated electronic and optical components, creating a monolithic opto-electronic subsystem.

Other and further advantages and embodiments of the present invention will become apparent during the course of the following discussion and by reference to the accompanying drawings.

BRIEF DESCRIPTION OF THE DRAWINGS

Referring now to the drawings,

FIG. 5(a) illustrates the formation of a prior art PN device.

DETAILED DESCRIPTION

Figure 1A:
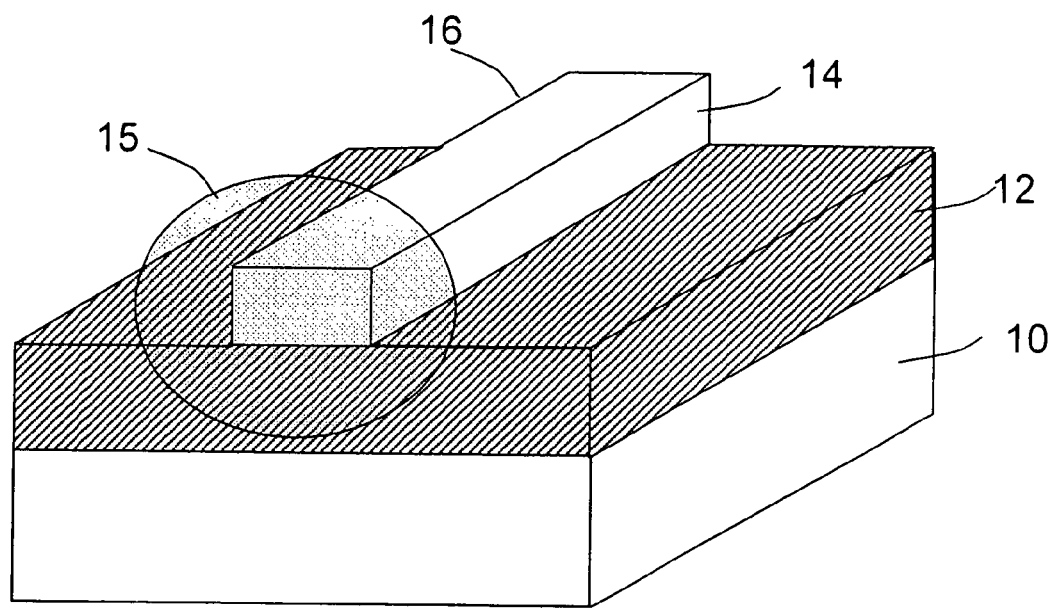
FIGS. 1(a) and 1(b) contain isometric views a prior SOI-based waveguide structure, FIG. 1(a) illustrating the formation of strip waveguide in the SOI layer and FIG. 1(b) illustrating the formation of a PBG structure in the SOI layer.
Figure 1B:
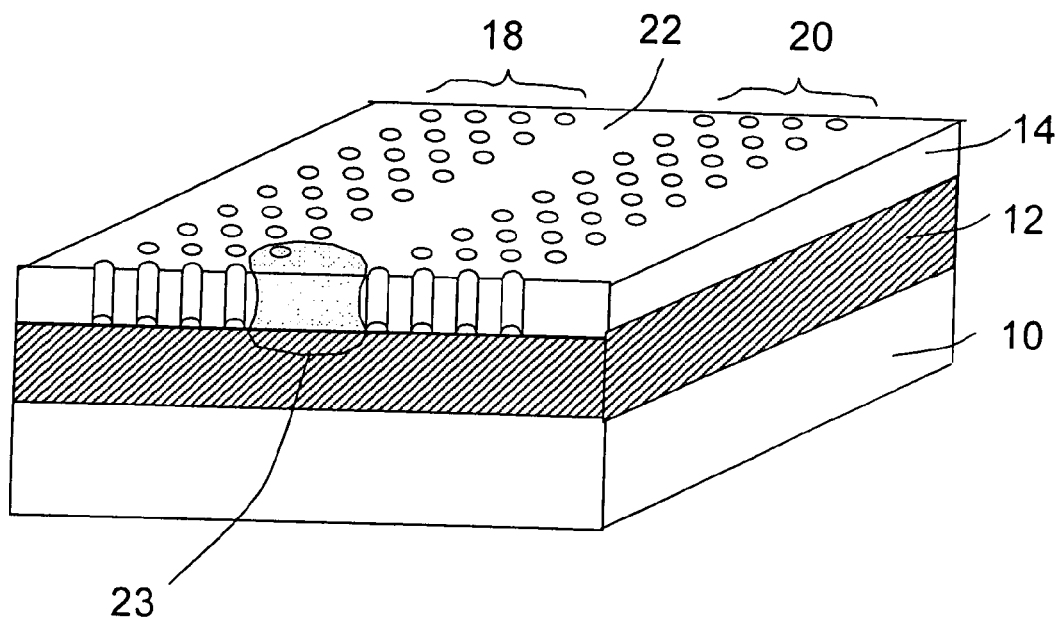

As mentioned above, the utilization of a PBG structure within an SOI-based electro-optic device results in providing relatively tight confinement of the propagating optical mode within the defined waveguide region, as opposed to prior structures where a significant amount of the optical power would reside in the evanescent tails in the cladding regions surrounding a silicon strip or rib waveguide. FIGS. 1(a) and 1(b) illustrate this aspect of an exemplary PBG structure, where FIG. 1(a) illustrates a prior art SOI structure comprising a silicon substrate 10, an insulating layer 12 and an SOI layer 14. The boundary of an optical mode 15 for a signal propagating along a strip waveguide 16 formed in SOI layer 14 is also shown. It is obvious from this depiction that a significant portion of the energy within optical mode 15 resides in the evanescent tails within insulating layer 12, as well as in the other low index materials (not shown) that surround strip waveguide 16. FIG. 1(b) illustrates the improvement in light confinement within a strip waveguide by virtue of using a PBG structure to define the waveguide boundaries. As shown, the PBG waveguide structure is formed on the same silicon substrate 10 and insulating layer 12 as discussed above in association with FIG. 1(a). In this case, SOI layer 14 is further processed to include a regular lattice structure of holes through the thickness thereof, the lattice structure thus forming the PBG arrangement. A first plurality of holes 18 is formed within one side of SOI layer 14 in a regular structure and a second plurality of holes 20 is formed on the other side, with a central portion 22 of SOI layer 14 remaining unprocessed. Thus, central portion 22 will define the waveguide structure, as bounded by PBG structures 18 and 20. As shown, the presence of PBG structures 18 and 20 results in confining the optical mode 23 in a manner such that lateral tailing of the mode along SOI layer 14 is minimized. It is to be understood that the illustrated mode profiles in these and the following figures are exemplary only and for the purposes of discussion. The specific mode profiles for an actual device would depend upon a variety of factors, such as the refractive indexes of the materials, thickness of the layers, hole pattern of the PBG structures, etc.

Active control of an SOI-based PBG structure in accordance with the present invention, is achieved by introducing free carriers (N) into the silicon waveguide region (such as central portion 22 of SOI layer 14) of the PBG structure to alter the real and imaginary parts of the dielectric constant ($\in$) at a frequency ω, based on the free carrier effect as defined by the following equation:

$$\varepsilon = \varepsilon_{Si} - \left(\frac{Ne^2}{\varepsilon_0 \omega^2 m^*}\right),$$

where $\in_{Si}$ is the dielectric constant of silicon, $\in_0$ is the permittivity of free space and m* is the optical effective mass of the electron and holes.

It has been discovered during the course of developing this invention that a key to achieving a high degree of optical modulation in a very small length of a PBG waveguide (the small length a necessity to minimize waveguide transmission losses, as well as to achieve a higher level of integration), is to optimize the overlap of a high optical intensity region with a region of maximum change in refractive index. Additionally, as will be discussed further below, the speed of the device (in instances where modulation or switching is required) can be improved by placing the required electrodes as close to the optical modulation region as possible. A competing concern, however, remains the optical loss associated with the electrodes (the complete contact structure including highly-doped silicon regions, silicides and metals). Fortunately, the tight lateral confinement of the propagating mode associated with the inventive PBG structure allows for the electrodes to be placed in relatively close proximity to the waveguide, without a significant portion of the optical energy being captured within the contact region. Thus, optical losses are kept relatively low, while the device speed can be maintained in the Gb/s range.

An SOI structure further comprising a polysilicon layer disposed over the surface SOI layer has been used in many arrangements to provide a variety of configurations for optical mode confinement. Silicon-Insulator-Silicon CAPacitor (SISCAP) structures are able to form a variety of modulating electro-optic devices utilizing free carrier-based phase modulation. Indeed, embodiments of the present invention may be created by using a SISCAP design that is compatible with the layer thicknesses of various SOI CMOS processes currently in use. As described in detail in commonly-assigned U.S. Pat. No. 6,845,198, SISCAP devices provide for reduced optical insertion loss by using an inherent effective index contrast between the waveguide and surrounding cladding areas. Moreover, the SISCAP arrangement enables very high speed modulation in silicon by using small device geometries, allowing the RC time constants to be consistent with the required data rate (for example, 1 Gb/s and above, approaching at least 10 Gb/s). For the purposes of the present invention, amorphous silicon (which exhibits similar optical mode confinement properties as polysilicon) can be used interchangeably with polysilicon so as to form inventive SISCAP structures. In general, any appropriate silicon material, such as polysilicon, amorphous silicon, strained-layer silicon, grain-size-enhanced silicon, grain-boundary-passivated silicon, grain-aligned silicon, $Si_xGe_{1-x}$, substantially single crystal silicon, single crystal silicon, or any combination may be used to form this device layer, taking into consideration both the optical properties (associated with grain size, optical absorption) of the various forms of silicon as well as the electrical properties (mobility, conductivity, etc.), in order to optimize these properties to minimize optical loss in the selected material while providing a relatively low electrical resistance. For the sake of the simplicity, the remainder of this discussion will be directed to the use of polysilicon layers, with the understanding that the same concepts may be applied to any of the above-referenced types of silicon.

Figure 2:
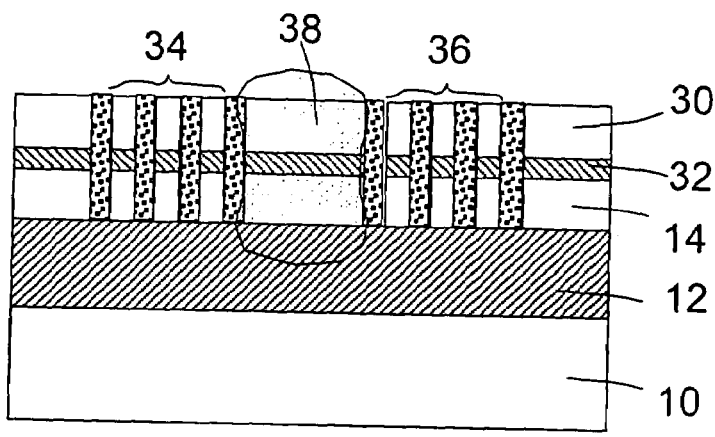
FIG. 2 shows an SOI-based PBG structure including a polysilicon layer disposed over the surface SOI layer of the SOI structure so as to form a SISCAP structure, with the PBG lattice formed (etched) through the combination of the polysilicon layer, an interface gate dielectric and the SOI layer.
Figure 3:
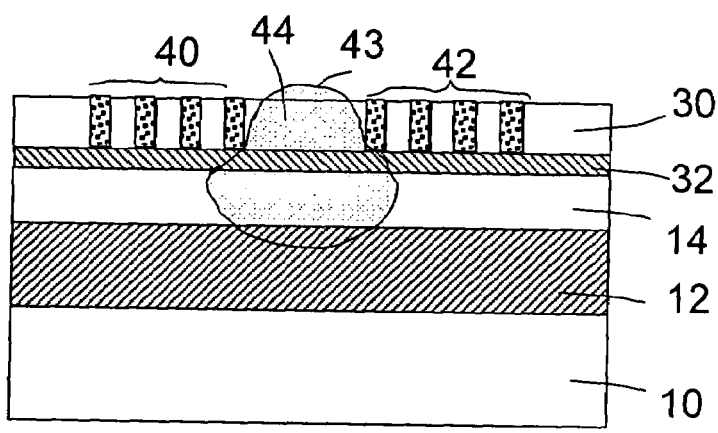
FIG. 3 illustrates an alternative SOI-based PBG structure, with the PBG lattice formed within only the polysilicon layer.

Polysilicon-loaded PBG waveguides can be formed by etching both the polysilicon layer and the underlying SOI layer in a self-aligned manner, preferably forming the columnar holes in a single photolithography/etching step. FIG. 2 illustrates an exemplary SOI-based PBG waveguide structure, where a polysilicon layer 30 has been formed over SOI layer 14, with a relatively thin dielectric insulating layer 32 (often referred to hereinafter as the "gate dielectric") separating polysilicon layer 30 from SOI layer 14. A first plurality of columnar holes 34 and a second plurality of columnar holes 36 are illustrated as etched completely through the thicknesses of polysilicon layer 30, dielectric layer 32 and SOI layer 14, so as to form a waveguiding region 38 within the combined areas of SOI layer 14, dielectric 32 and polysilicon layer 30, and bounded in the lateral dimension by PBG structures 36, 38. A conventional CMOS fabrication technique using a self-aligned multi-layer etching process including a single photomask may be used to form the desired PBG structures 36, 38. In contrast, as illustrated in FIG. 3, only polysilicon layer 30 may be etched (using insulating layer 32 as an "etch stop"), with a first plurality of columnar holes 40 and a second plurality of columnar holes 42 etched through only the thickness of polysilicon layer 30. This particular structure results in a different optical mode confinement boundary 43 with respect to waveguiding region 44, as shown.

Figure 4:
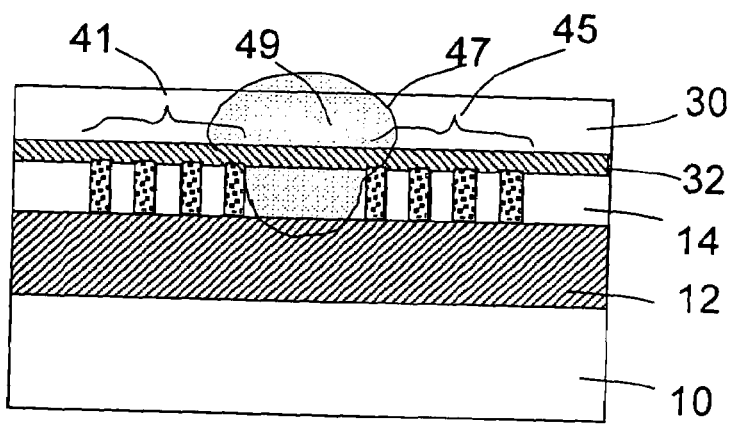
FIG. 4 illustrates another SOI-based PBG structure, within this case the PBG structure is formed only within the SOI layer.

In another variation, the PBG structure may be etched into SOI layer 14 before gate dielectric 32 and polysilicon layer 30 are deposited. FIG. 4 illustrates this particular arrangement, with PBG structures 41 and 45 formed in SOI layer 14. The optical mode confinement 47 within waveguiding region 49 is shown to be well-confined within SOI layer 14, and begin to tail somewhat out of waveguiding region 49 within polysilicon layer 30. In forming this exemplary structure, the pluralities of columnar holes 41, 45 are first etched in SOI layer 14 and then filled with an oxide or other appropriate dielectric material. A planarization process (such as, for example, chemical-mechanical planarization (CMP)) is then used to restore a sufficiently planar surface on the SOI structure. Gate dielectric layer 32 and polysilicon layer 30 are then sequentially deposited over the re-planarized surface.

In accordance with the present invention, the advantages of PBG-defined waveguide boundaries have been provided with active SOI-based electro-optic devices in order to provide for a number of improvements in the SOI structure. In particular, the use of the PBG structure allows for very tight lateral confinement of the optical mode within a waveguide of very small cross section. The smaller volume of the waveguide, in turn, allows for relatively low bias voltages (when compared to the prior art) to be sufficient for inducing modulating charge density in the device active region. Moreover, the tight optical confinement significantly reduces optical loss within the device structure and permits the electrodes to be placed relatively close to the waveguide. Further, the doping profiles of the SOI-based PBG device can be optimized using conventional lithography/ion implantation techniques to further reduce optical losses in the active region and minimize exposure of the charge carriers to the silicon/oxide interfaces. At a higher level, the ability to significantly reduce the size of the overall device results in a reduction of the capacitance/resistance inherent in the various components within the structure.

Figure 5:
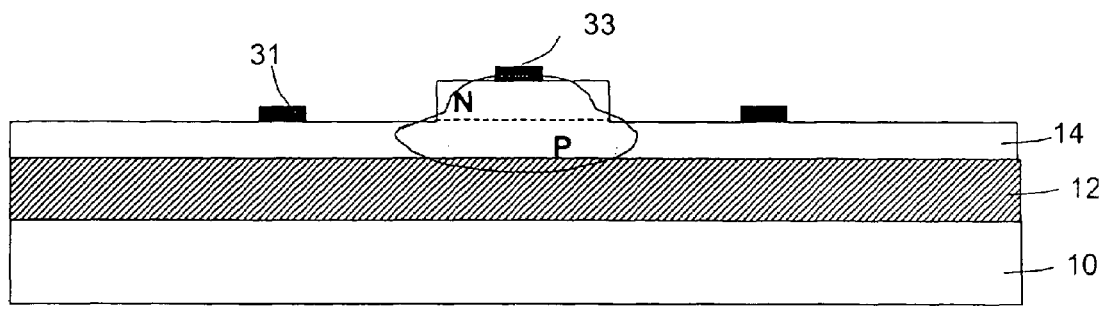
FIGS. 5(a), (b) and (c) illustrate exemplary SOI-based PN device, where
FIG. 5(b) illustrates an SOI-based vertical PN device utilizing a PBG structure in accordance with the present invention and FIG. 5(c) a similarly-formed lateral PN SOI-based PN device.
Figure 5:
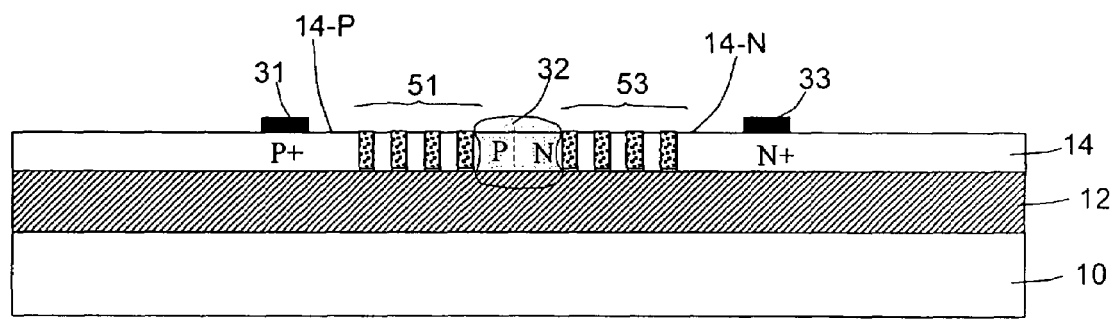
Figure 5:
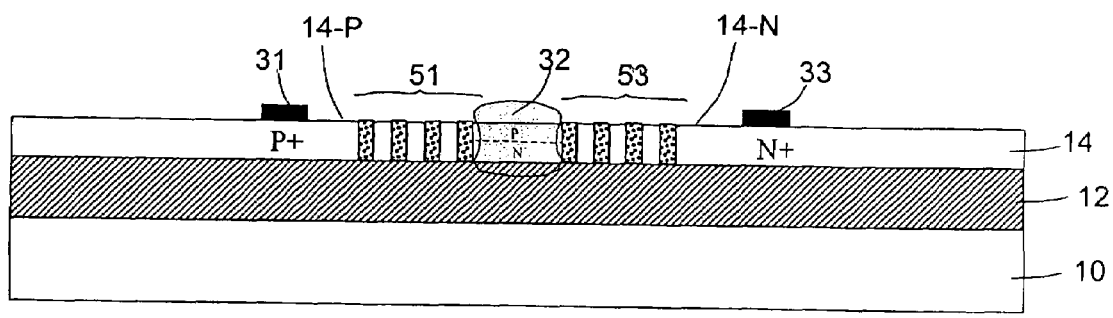

In its most basic form, an SOI-based PBG PN junction device may be formed that exhibits significant advantages over conventional silicon waveguide devices. FIG. 5(a) illustrates a conventional, prior art silicon PN junction rib waveguide device, with SOI-based PBG PN junction devices being shown in FIGS. 5(b) and 5(c). Referring to FIG. 5(a), the PN structure comprises a p-doped SOI layer 14 and an n-doped layer 13 formed over a portion of SOI layer 14, where the sidewalls of n-doped rib 13 define the optical mode boundaries in the lateral dimension. A first electrical contact 31 is disposed to contact an end portion of p-doped SOI layer 14 and a second electrical contact 33 disposed to contact a portion of n-doped layer 13. The application of an electrical signal between contacts 31 and 33 results in an optical signal being created by carrier transfer in the lateral dimension, with significant spreading of the optical mode, as shown. In as much as the electrical contacts overlap the optical signal path, the resultant structure is very lossy and the optimization of loss vs. speed is difficult to manipulate.

An improvement in this SOI-based PN structure is provided, in accordance with the present invention, by the inclusion of PBG photonic crystal structures, in the form of lattice-disposed columnar holes, that are etched through the thickness of SOI layer 14. FIG. 5(b) illustrates an exemplary embodiment of this improved structure, with a first set of columnar holes 51 etched through a p-doped region 14-P of SOI layer 14 and a second set of columnar holes 53 etched through an n-doped region 14-N of SOI layer 14. As shown, the improvement in mode confinement within the waveguiding region of SOI layer 14 is significant. Indeed, the vertical PN device structure of FIG. 5(b) may exhibit the various other advantages of the present invention as discussed above, in terms of electrode placement and ability to utilize a smaller overall device structure than was possible with the prior art arrangements. An alternative embodiment is illustrated in FIG. 5(c), where a lateral PN structure is formed with the P region disposed over the N region (or vice versa) within the waveguiding region.

As mentioned above, an electro-optic SOI-based PBG device formed in accordance with the present invention may include a polysilicon layer (or other suitable type of silicon) that is utilized as an active semiconductor device layer, with the free carrier mobility and dopant conductivity within the polysilicon layer being optimized to provide a fast response, while also providing low absorption of the optical signal to achieve the desired optical modulation properties. In particular, it is desirable to have a maximum overlap between the optical field in the waveguide and the modulating free carrier concentration. This particular characteristic of active SOI devices is thoroughly described in our U.S. Pat. No. 6,845,198 issued Jan. 18, 2005 and herein incorporated by reference. In general, and as described in our '198 patent, optimized overlap of optical field and modulating free carriers is achieved by selecting similar effective optical thicknesses for the SOI layer and the polysilicon layer, as centered around the relatively thin dielectric layer. In this case, the free carrier densities in both layers are actively modulated in the vicinity of the gate dielectric.

Figure 6:
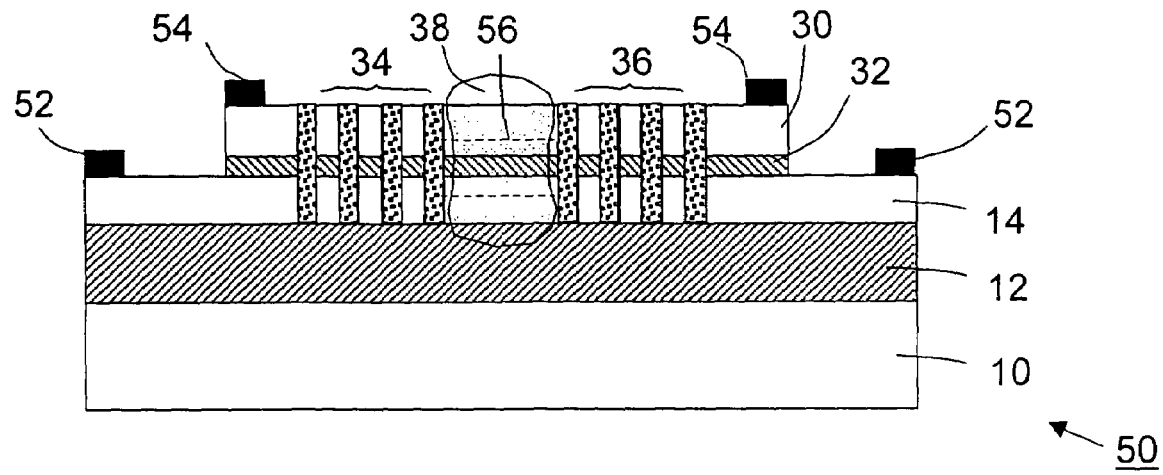
FIG. 6 is a cut-away side view of an exemplary active, tunable SOI-based PBG structure formed in accordance with the present invention.

FIG. 6 illustrates an exemplary SOI-based PBG electro-optic device 50 formed in accordance with the present invention, based on this overlap of optical field and modulating free carriers. The structure of device 50 is based upon that illustrated in FIG. 2, using a silicon substrate 10, insulating layer 12 and SOI layer 14 to define the basic SOI structure. Polysilicon layer 30 is disposed over SOI layer 14, with relatively thin gate dielectric layer 32 disposed between SOI layer 14 and polysilicon layer 30. SOI layer 14 may comprise single crystal silicon, or strained silicon, and is appropriately doped (with respect to polysilicon layer 30) so that an active device region is formed upon the application of an electrical signal. Polysilicon layer 30 (which is also appropriately doped) may comprise one of the various forms of silicon as defined hereinabove. The PBG structure comprises first plurality of columnar holes 34 etched through the combination of polysilicon layer 30, gate dielectric 32 and SOI layer 14. Second plurality of holes 36 is similarly formed, with waveguide region 38 disposed therebetween. As is well-known in the art, first and second pluralities of holes 34 and 36 may be "filled"0 with a relatively low index material (such as an oxide or nitride). In order to provide active operation of the structure, a first set of electrodes 52 is coupled to SOI layer 14 and a second set of electrodes 54 is coupled to polysilicon layer 30. The application of a bias between electrodes 52 and 54 results in the formation of a modulated charge carrier concentration region 56 in both polysilicon layer 30 and SOI layer 14 in the vicinity of gate dielectric 32. The overlap between the optical mode and the modulating free carriers thus occurs within waveguide 38, in proximity to gate dielectric 32, as shown in FIG. 6. Accordingly, as the applied electrical signal is modulated, the optical signal within waveguide 38 will similarly be modulated. Advantageously, the use of a PBG structure allows for tight confinement of the optical mode within the waveguide, such that relatively little of the signal is lost to the surrounding "cladding" structure (the cladding structure being defined as the PBG regions surrounding waveguide 38). Moreover, the PBG structure allows for contacts 52, 54 to be disposed in relatively close proximity to waveguide 38, thus providing the ability for gigabit-speed operation in terms of switching the charge carrier density between polysilicon layer 30 and SOI layer 14.

Figure 7:
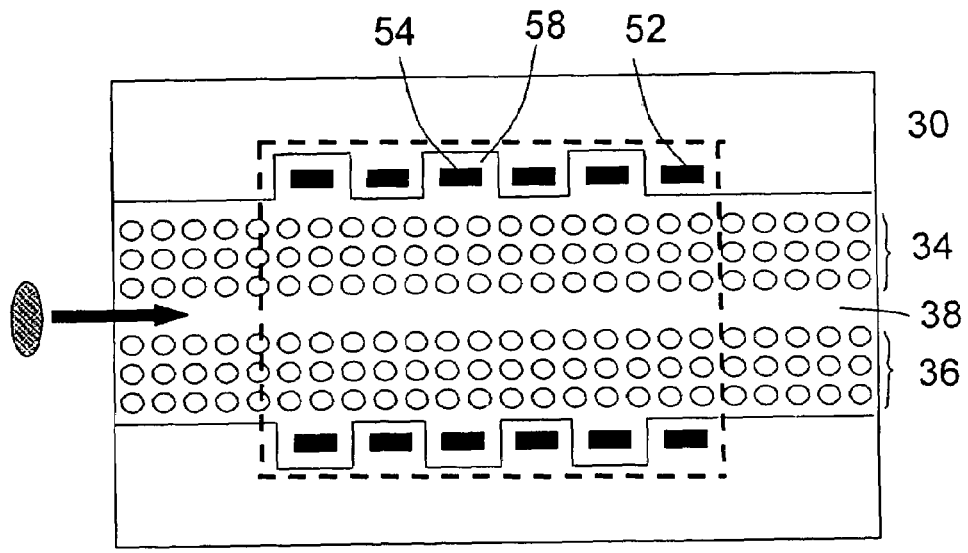
FIG. 7 is a top view of the arrangement of FIG. 6, illustrating the use of a plurality of separate contact regions to reduce the resistivity of the contact area (improving the switching speed of the device)

FIG. 7 contains a top view of an exemplary arrangement of the tunable device of FIG. 6, where in this embodiment distributed sets of electrodes 52 and 54 are utilized to reduce the resistance between the contacts and the modulating regions and further improve the switching speed of the active SOI-based PBG device. In this view, it is shown that polysilicon layer 30 has been patterned to include tab regions 58 where electrodes 42 may be disposed. Advantageously, the utilization of the PBG structure (illustrated in this top view of FIG. 7 as first photonic crystal array 34 and second photonic crystal array 36) provides for relatively tight optical mode confinement (as mentioned above), allowing for the electrodes to be in relatively close proximity to waveguide region 38 without capturing a significant portion of the optical energy. While the dotted-line boundary of polysilicon layer 30 is shown in this view as essentially rectangular, it is to be understood that the polysilicon layer may be formed to include "tapered" input and/or output areas (as discussed in our '198 patent) in order to minimize reflections as the optical signal transitions between SOI layer 14 and the SOI layer 14/polysilicon layer 30 combination.

Figure 8:
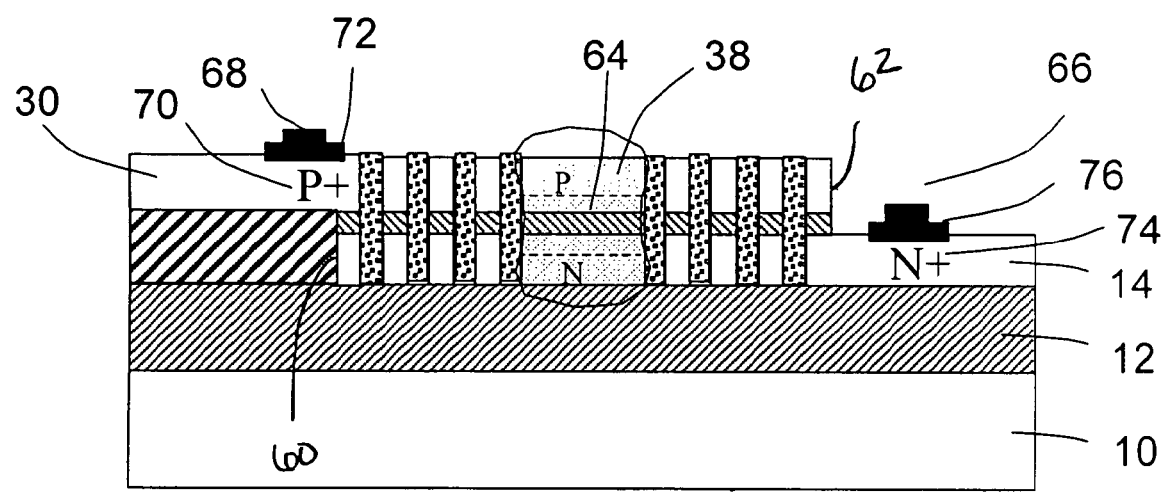
FIG. 8 is a cut-away side of another embodiment of an active SOI-based PBG structure formed in accordance with the present invention, utilizing a different overlapping geometry between the SOI layer and the polysilicon layer.

Various other modulating arrangements may be formed using the SOI-based based PBG structure as discussed above, where our above-referenced U.S. Pat. No. 6,845,198 discloses many of these arrangements, including various doping alternatives (doping of both SOI layer 14 and polysilicon layer 30) and various overlapping constructs. All of these variations are considered to be applicable to the PBG structure formed in accordance with the present invention. FIG. 8 illustrates one exemplary overlap variation, in this case with the "overlap" between SOI layer 14 and polysilicon layer 30 defined by terminating edges 60 and 62 of SOI layer 14 and polysilicon layer 30, respectively. The overlap thus defines a region 64 of modulated charge carrier concentration, with the optical mode well-confined within waveguide 38. In this case, electrical contacts to SOI layer 14 and polysilicon layer 30 are formed as shown, with a first electrical contact 66 disposed over a portion of SOI layer 14 removed from waveguide region 38, and a second electrical contact 68 disposed over a portion of polysilicon layer 30 also removed from waveguide region 38.

In terms of doping variations, an exemplary embodiment of the present invention may utilize a p-doped polysilicon layer 30 and an n-doped SOI layer 14 (or vice versa), so as to form a capacitive structure. Layered, or graded dopant profiles may be employed as desired. Moreover, the lateral doping concentration may be graded, as particularly described in our above-referenced patent, to create regions of higher dopant concentration in the electrical contact areas. Referring to FIG. 8, if polysilicon layer 30 is p-doped, a p+-doped region 70 may be formed in the area of contact 68, with a silicides layer 72 formed on the surface of polysilicon layer 30 to form the actual electrical connection. A similarly-formed n+ region 74 and silicide connection 76 may be used for contact to an n-type SOI layer 14. In this case, the silicides contacts 72, 76 and highly doped regions 70, 74 are desired to be located away from the light confinement region so as to minimize optical losses through absorption. A competing desire, however, is to keep the contacts as close to optical waveguide 38 as possible in order to maximize the speed of modulation as the applied electrical signal is modulated. By virtue of utilizing the PBG light confinement arrangement in accordance with the present invention, the contacts may be located considerably closer to the optical confinement region than previously considered reasonably with a conventional SOI structure.

Figure 9:
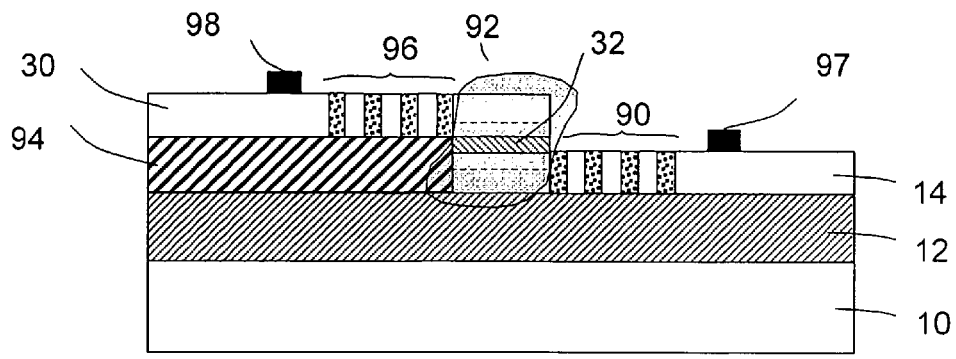
FIG. 9 is a side view of yet another embodiment of the present invention.
Figure 10:
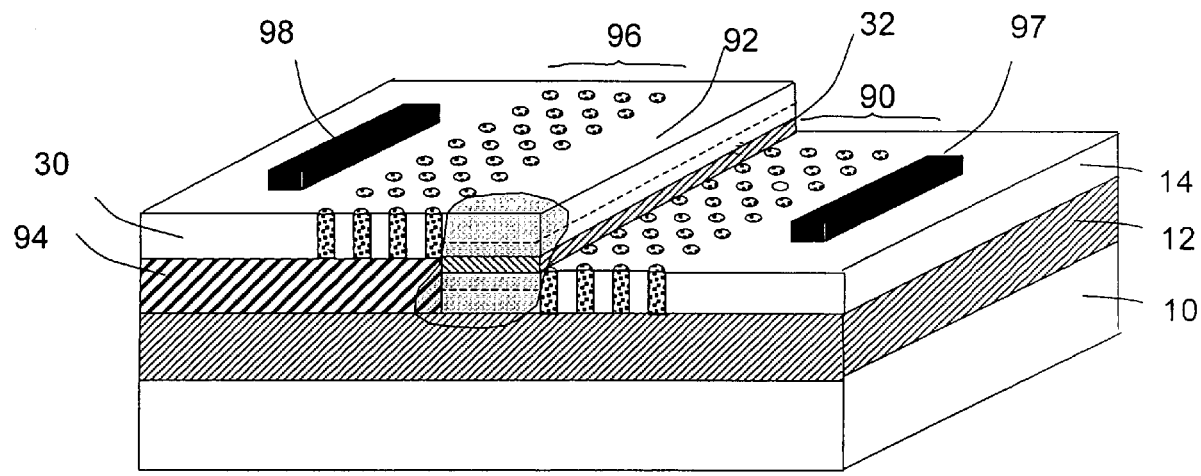
FIG. 10 is an isometric view of the arrangement of FIG. 9.

FIG. 9 contains a side view of another SOI-based PBG electro-optic device of the present invention, where an isometric view is illustrated in FIG. 10. In this particular device structure, a first PBG array 90 is formed within SOI layer 14 to define a first lateral confinement portion for the optical signal propagating within a defined waveguide region 92. Subsequent to the formation of first PBG array 90, a dielectric material 94 is deposited to re-planarize the structure. Gate dielectric 32 and polysilicon layer 30 are then formed, as before, and a second PBG array 96 is formed as shown through polysilicon layer 30. Thus, the combination of first and second PBG arrays 90 and 96 provide the desired lateral confinement of the optical mode within waveguide 92. A first electrical contact 97 is positioned over SOI layer 14 and a second electrical contact 98 is positioned over polysilicon layer 30. In this particular embodiment of the present invention, gate dielectric layer 32 has been processed such that only the portion within the active waveguiding region 92 remains, so as to form the necessary SISCAP structure. The elimination of the unnecessary gate dielectric allows for capacitance of the device to be significantly reduced, thus increasing its speed of operation. As shown, electrical contacts 97 and 98 can be positioned in relative close proximity to waveguiding region 92 (compare with the placement of electrical contacts 66 and 68 in the embodiment of FIG. 8).

What is claimed is:

1. A photonic bandgap (PBG) electro-optic device formed within a silicon-on-insulator (SOI) structure comprising a silicon substrate, an insulating layer disposed over the substrate and a relatively thin silicon surface layer (SOI layer) formed over the insulating layer, the SOI layer used, at least in part, for guiding the mode of an optical signal propagating therethrough, the PBG electro-optic device comprising:

a relatively thin dielectric layer disposed over at least a portion of the SOI layer;

a silicon layer disposed over at least a portion of the relatively thin dielectric layer in a manner such that overlapping portions of the relatively thin SOI layer, the relatively thin dielectric layer and the silicon layer define an active region of the device, the silicon layer and SOI layer exhibiting complementary doping within the active region;

a plurality of columnar holes formed through the SOI structure and disposed in a predetermined pattern such that the spacing between adjacent holes defines a photonic bandgap structure including an optical waveguiding region within at least a portion of the SOI layer, the photonic bandgap structure providing lateral confinement of a propagating optical mode within the optical waveguiding region; and first and second electrical contacts disposed at locations disparate from the optical waveguiding region and substantially adjacent to the plurality of columnar holes on the SOI structure so as to absorb a minimum amount of the signal propagating along the optical waveguiding region, wherein upon application of an electrical signal between the first and second electrical contacts, free carriers move such that the optical field of said propagating optical signal is bounded, at least in part in the lateral dimension, by the photonic bandgap structure, the optical field thereby substantially overlapping the free carrier concentration modulation area in the active region of the electro-optic device, wherein the first electrical contact is coupled to the SOI layer and the second electrical contact is coupled to the silicon layer such that upon application of an electrical signal between the first and second electrical contacts, free carriers accumulate, deplete or invert within the SOI layer and the silicon layer on both sides of the relatively thin dielectric layer at the same time.

2. A photonic bandgap electra-optic device as defined in claim 1 wherein the doping profiles of the silicon layer and the SOI layer are controlled so as to achieve maximum overlap between the propagating optical mode in the active region and the area of free carrier change, while simultaneously reducing the overall resistance in the paths to the electrical contacts.

3. A photonic bandgap (PBG) electra-optic device as defined in claim 1 wherein the plurality of holes extend from the silicon layer through the relatively thin dielectric layer and the SOI layer in a self-aligned manner.

4. A photonic bandgap (PBG) electro-optic device as defined in claim 1 wherein the plurality of holes of the PBG structure are formed within only the SOI layer.

5. A photonic bandgap (PBG) electra-optic device as defined in claim 1 wherein the plurality of holes of the PBG structure are formed within only the silicon layer.

6. A photonic bandgap (PBG) electro-optic device as defined in claim 1 wherein a first set of the plurality of holes of the PBG structure are formed within only the SOI layer and a second set of the plurality of holes of the PBG structure are formed within only the silicon layer, each set disposed at a separate boundary of the active waveguiding region so as to define the lateral confinement area.

7. A photonic bandgap (PBG) electra-optic device as defined in claim 1 wherein the plurality of holes are subsequently filled with a low refractive index material.

8. A photonic bandgap (PBG) electro-optic device as defined in claim 1 wherein the plurality of holes are subsequently filled with an oxide material.

9. A photonic bandgap (PBG) electro-optic device as defined in claim 1 wherein the plurality of holes are subsequently filled with a nitride material.

10. A photonic bandgap (PBG) electro-optic device as defined in claim 1 wherein the silicon layer comprises a form of silicon selected from the group consisting of: polysilicon, amorphous silicon, grain-size-enhanced polysilicon, grain-boundary-passivated polysilicon, grain-aligned polysilicon, strained silicon, substantially single crystal silicon, $Si_xGe_{1-x}$ and single crystal silicon.

11. A photonic bandgap (PBG) electro-optic device as defined in claim 1 wherein the first electrical contact region comprises a plurality of separate contact areas disposed along the SOI layer in the direction of optical signal propagation so as to reduce optical signal loss while providing low series resistance.

12. A photonic bandgap (PBG) electro-optic device as defined in claim 1 wherein the second electrical contact region comprises a plurality of separate contact areas disposed along the silicon layer in the direction of optical signal propagation so as to reduce optical signal loss while providing low series resistance.

13. A photonic bandgap (PBG) electro-optic device as defined in claim 1 wherein a first set of columnar holes of the plurality of holes is disposed to form a first lateral confinement boundary for the optical waveguiding region and a second set of columnar holes is disposed to form a second lateral confinement boundary, wherein the characteristics, of the holes are controlled such that essentially all of the propagating mode is confined within the optical waveguiding region and optical loss is minimized.

14. A photonic bandgap (PBG) electro-optic device as defined in claim 1 wherein the SOI layer exhibits n-type conductivity and the silicon layer exhibits p-type conductivity.

15. A photonic bandgap (PBG) electro-optic device as defined in claim 1 wherein the doping profiles of the silicon layer and the SOI layer are graded so as to form a lightly doped active region and a heavily doped electrical contact region.

16. A photonic bandgap (PBG) electro-optic device as defined in claim 1 wherein the SOI layer exhibits p-type conductivity and the silicon layer exhibits n-type conductivity.

* * * * *